United States Patent
Huang et al.

(10) Patent No.: US 10,705,183 B2
(45) Date of Patent: Jul. 7, 2020

(54) SINGLE SAMPLING RADAR SIGNAL PROCESSING SYSTEM AND METHOD

(71) Applicant: SHENZHEN UNIVERSITY, Shenzhen, Guangdong (CN)

(72) Inventors: Jianjun Huang, Guangdong (CN); Xian Liu, Guangdong (CN); Jingxiong Huang, Guangdong (CN); Li Kang, Guangdong (CN); Shengyu Liang, Guangdong (CN); Zijian Zeng, Guangdong (CN)

(73) Assignee: SHENZHEN UNIVERSITY, Shenzhen (CN)

(*) Notice: Subject to any disclaimer, the term of this patent is extended or adjusted under 35 U.S.C. 154(b) by 0 days.

(21) Appl. No.: 16/662,116

(22) Filed: Oct. 24, 2019

(65) Prior Publication Data
US 2020/0132806 A1   Apr. 30, 2020

Related U.S. Application Data

(63) Continuation of application No. PCT/CN2018/111991, filed on Oct. 26, 2018.

(51) Int. Cl.
*G01S 7/292* (2006.01)

(52) U.S. Cl.
CPC .................. *G01S 7/292* (2013.01)

(58) Field of Classification Search
CPC ...................................... G01S 7/292
See application file for complete search history.

(56) References Cited

U.S. PATENT DOCUMENTS

| | | | | |
|---|---|---|---|---|
| 2004/0201516 A1* | 10/2004 | Lyon | ...................... | G01S 7/282 342/124 |
| 2009/0085799 A1* | 4/2009 | Serban | .................. | G01S 7/2926 342/205 |
| 2009/0103595 A1* | 4/2009 | Watanabe | ............... | G01S 7/526 375/219 |
| 2011/0037643 A1* | 2/2011 | Torin | ...................... | G01S 7/285 342/173 |
| 2012/0148002 A1* | 6/2012 | Kim | ...................... | G01S 7/2921 375/371 |
| 2013/0342388 A1* | 12/2013 | Maeno | .................. | G01S 7/2813 342/202 |

* cited by examiner

*Primary Examiner* — Timothy X Pham

(57) ABSTRACT

A single sampling radar signal processing system is disclosed, wherein the system comprises a pseudo-random sequence generator, an integral sampler, an ADC module, a controller and a compression domain detector, wherein the integral sampler is connected to the pseudo-random sequence generator, the controller and the ADC module, respectively, and the ADC module is connected to the compression domain detector. Since the initial integral sampling time of each pulse signal can be controlled when the integral sampler performs integral sampling on the pulse signal in the radar signal, each pulse signal is sequentially delayed by different times during integral sampling, and a sample value is obtained by compression sampling in a single pulse repetition period. A single sampling radar signal processing method is also disclosed.

10 Claims, 8 Drawing Sheets

SINGLE SAMPLING RADAR SIGNAL PROCESSING SYSTEM AND METHOD

CROSS-REFERENCE TO RELATED APPLICATION

This application is a continuation of International Application No. PCT/CN2018/111991, filed on Oct. 26, 2018, the content thereof is incorporated herein by reference in its entirety.

TECHNICAL FIELD

The present disclosure relates to the field of signal processing technologies, and in particular, to a single sampling radar signal processing system and method, which can use a single sample to detect radar target

BACKGROUND

With the development of science and technology, radar is widely used in many fields such as national defense and military, civil aviation control, topographic survey, meteorology and navigation. Therefore, the processing of radar signals has attracted more attention from researchers in this field.

For the radar signal with a large bandwidth, the traditional processing method is to sample the radar signal through Nyquist theorem, and then process the sampled signal. The traditional radar signal processing method will bring about the issues such as a large amount of data, a long processing time and a high real-time processing cost. Since the radar signal is sparse, the information collected through the Nyquist frequency sampling is redundant. Therefore, another system for processing radar signals is the system for processing radar signals based on compressed sensing. There are four main implementations based on compressed sensing: random sampling, random filter, random demodulation and modulation bandwidth converter.

However, the above system for processing radar signals based on compressed sensing has the defects such as a large number of analog-to-digital converters (ADCs), a low compression ratio, and a poor detection performance due to the limited implementations of compressed sensing.

SUMMARY

The main object of the present disclosure is to provide a single sampling radar signal processing system and method, aiming at solving the technical problem of the defects such as a large number of ADCs, a low compression ratio, and a poor detection performance due to the limited implementations of compressed sensing in the system for processing radar signals based on compressed sensing in the prior art.

The first embodiment of the present disclosure provides a single sampling radar signal processing system, wherein the system comprises:
a pseudo-random sequence generator, an integral sampler, an ADC module, a controller and a compression domain detector; wherein
the pseudo-random sequence generator comprises a pseudo-random sequence output end;
the integral sampler comprises a radar signal input end, a pseudo-random sequence receiving end, an integral sampling value output end, a clear signal input end and a control signal input end;
the ADC module comprises an integral sampling value input end and a compression measuring value output end;
the controller comprises a clear signal output end and a control signal output end;
the compression domain detector comprises a compression measuring value input end and a target position output end;
the radar signal input end is connected to a receiving end of the radar, the pseudo-random sequence receiving end is connected to the pseudo-random sequence output end, the integral sampling value output end is connected to the integral sampling value input end, the clear signal input end is connected to the clear signal output end, and the control signal input end is connected to the control signal output end;
the compression measuring value output end is connected to the compression measuring value input end;
the pseudo-random sequence generator is configured to generate a pseudo-random sequence according to a low-speed clock signal input by an external clock, and send the pseudo-random sequence to the integral sampler;
the controller is configured to generate a clear signal and a control signal after receiving a synchronization signal sent by the radar, send the clear signal to the integral sampler, and send the control signal to the integral sampler;
the integral sampler is configured to perform integral sampling on the radar signal according to the pseudo-random sequence, the clear signal and the control signal after receiving the radar signal, which is sent by the radar, of the target to be detected, and control an initial integral sampling time of each pulse signal in the radar signal, so that each of the pulse signals is sequentially delayed by a preset time during integral sampling;
the integral sampler is further configured to send the integral sampling value of one of the pulse signals to the ADC module after obtaining an integral sampling value of one of the pulse signals each time;
the ADC module is configured to quantize the integral sampling value of the pulse signal after receiving the integral sampling value of the pulse signal, obtain a compression measuring value of the pulse signal, and send the compression measuring value of the pulse signal to the compression domain detector; and
the compression domain detector is configured to take a plurality of the pulse signals as a compression sampling period, obtain the target position of the target to be detected according to the compression measuring value of all the pulse signals in one of the compression sampling periods, and output the target position from the target position output end.

The second embodiment of the present disclosure provides a single sampling radar signal processing method, wherein the method comprises:
performing, by an integral sampler, integral sampling on the radar signal according to a pseudo-random sequence, a clear signal and a control signal after receiving the radar signal, which is sent by the radar, of the target to be detected, and controlling an initial integral sampling time of each pulse signal in the radar signal, so that each of the pulse signals is sequentially delayed by a preset time during integral sampling;
sending, by the integral sampler, the integral sampling value of one of the pulse signals to an ADC module after obtaining an integral sampling value of one of the pulse signals each time;
quantizing, by the ADC module, the integral sampling value of the pulse signal after receiving the integral sampling value of the pulse signal, obtaining a compression measuring value of the pulse signal, and sending the compression measuring value of the pulse signal to a compression domain detector; and taking, by the compression domain detector, a plurality of the pulse signals as a compression sampling period, obtaining a target position of the target to be detected according to the compression measuring value of all the pulse signals in one of the compression sampling periods, and outputting the target position from a target position output end.

Embodiments of the present disclosure provide a single sampling radar signal processing system and method, wherein the system comprises: a pseudo-random sequence generator, an integral sampler, an ADC module, a controller and a compression domain detector, wherein the integral sampler is connected to the pseudo-random sequence generator, the controller and the ADC module, respectively, and the ADC module is connected to the compression domain detector. Since the initial integral sampling time of each pulse signal can be controlled when the integral sampler performs integral sampling on the pulse signal in the radar signal, each pulse signal is sequentially delayed by different times during integral sampling, and a sample value is obtained by compression sampling in a single pulse repetition period, so as to sample at a sampling frequency much lower than the Nyquist frequency. The system has the advantages such as a low sampling frequency, a simple structure, a small number of ADCs, a high compression ratio and a good detection effect when processing the radar signal.

BRIEF DESCRIPTION OF THE DRAWINGS

In order to more clearly illustrate the embodiments of the present disclosure or the technical solutions in the prior art, the drawings used in the embodiments or the description of the prior art will be briefly described below. It is obvious that the drawings in the following description are merely some embodiments of the present disclosure. Other drawings can be obtained according to these drawings for those skilled in the art without creative efforts.

DESCRIPTION OF THE EMBODIMENTS

The technical solutions in the embodiments of the present disclosure will be clearly and completely described in conjunction with the drawings in the embodiments of the present disclosure so that the objects, features and advantages of the present disclosure are more obvious and understandable. It is obvious that the described embodiments are merely a part of the embodiments of the present invention, rather than all of the embodiments. All other embodiments obtained by those skilled in the art based on the embodiments of the present disclosure without creative efforts fall within the scope of protection of the present disclosure.

Figure 1:
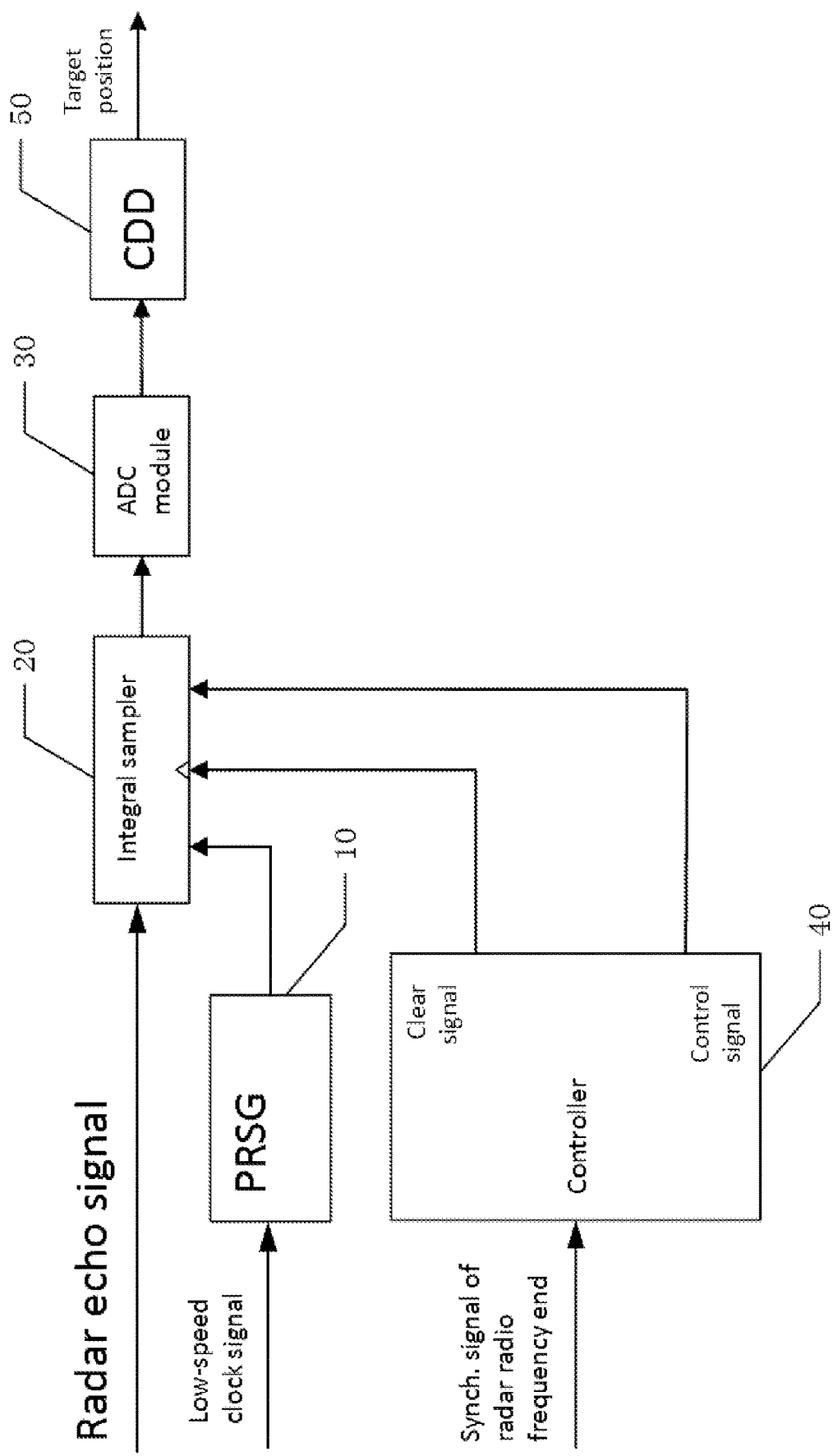
FIG. 1 is a system structural diagram illustrating a single sampling radar signal processing system according to an embodiment of the present disclosure.

Refer to FIG. 1, FIG. 1 is a system structural diagram illustrating a single sampling radar signal processing system according to an embodiment of the present disclosure, wherein the system comprises:

a pseudo-random sequence generator (PRSG) 10, an integral sampler 20, an ADC module 30, a controller 40 and a compression domain detector (CDD) 50.

The pseudo-random sequence generator 10 comprises a pseudo-random sequence output end.

The integral sampler 20 comprises a radar signal input end, a pseudo-random sequence receiving end, an integral sampling value output end, a clear signal input end and a control signal input end.

The ADC module 30 comprises an integral sampling value input end and a compression measuring value output end.

The controller 40 comprises a clear signal output end and a control signal output end.

The compression domain detector 50 comprises a compression measuring value input end and a target position output end.

Further, the radar signal input end of the integral sampler 20 is connected to a receiving end of the radar, the pseudo-random sequence receiving end of the integral sampler 20 is connected to the pseudo-random sequence output end of the pseudo-random sequence generator 10, the integral sampling value output end of the integral sampler 20 is connected to the integral sampling value input end of the ADC module 30, the clear signal input end of the integral sampler 20 is connected to the clear signal output end of the controller 40, and the control signal input end of the integral sampler 20 is connected to the control signal output end of the controller 40.

Further, the compression measuring value output end of the ADC module 30 is connected to the compression measuring value input end of the compression domain detector 50.

The pseudo-random sequence generator 10 is configured to generate a pseudo-random sequence according to a low-speed clock signal input by an external clock, and send the pseudo-random sequence to the integral sampler 20.

The radio frequency end of the radar sends a synchronization signal (PRI_clk). When the radio frequency end of the radar starts to send the radar signal, the radar starts to operate and generates a synchronization signal, which may be generated by the rising edge of the enable signal starting the radar or may be generated by the rising edge of the enable signal of the radio frequency signal sent to the radio frequency end.

The external clock generates a low-speed clock signal (low_clk). When the clock signal is used in a synchronous circuit, the clock signal functions as a timer to ensure that the relevant electronic components can operate synchronously. The low-speed clock signal is a clock signal having a frequency much lower than the Nyquist sampling frequency so that the pseudo-random sequence generator 10 generates a pseudo-random sequence (clk_SI) according to the low-speed clock signal.

The controller 40 emits a reset signal (RST). After the pseudo-random sequence generator 10 receives the reset signal, the pseudo-random sequence generator 10 resets the pseudo-random sequence according to the reset signal.

The controller 40 emits a control signal (EN) as an enable signal of the integral sampler 20 and the pseudo-random sequence generator 10.

The pseudo-random sequence generator 10 generates a pseudo-random sequence as a low-speed clock signal of the integral sampler 20. The integral sampler 20 controls the sampling point position at the time of sampling the radar signal by a pseudo-random sequence.

After the control signal is inverted, an inverted control signal (ADC_clk) is obtained, which is used as the low-speed clock signal of the ADC module 30.

The controller 40 sends a clear signal (CLR) to the integral sampler 20. The clear signal is used by the integral sampler to clear the internal data after the integral sampler 20 receives the clear signal.

The controller 40 is configured to generate a clear signal and a control signal after receiving a synchronization signal sent by the radar, send the clear signal to the integral sampler 20, and send the control signal to the integral sampler 20.

The integral sampler 20 is configured to perform integral sampling on the radar signal according to the pseudo-random sequence, the clear signal and the control signal after receiving the radar signal, which is sent by the radar, of the target to be detected, and control the initial integral sampling time of each pulse signal in the radar signal, so that each of the pulse signals is sequentially delayed by a preset time during integral sampling.

The integral sampler 20 is further configured to send the integral sampling value of one of the pulse signals to the ADC module 30 after obtaining an integral sampling value of one of the pulse signals each time.

The ADC module 30 is configured to quantize the integral sampling value of the pulse signal after receiving the integral sampling value of the pulse signal, obtain a compression measuring value of the pulse signal, and send the compression measuring value of the pulse signal to the compression domain detector, wherein the quantization refers to a process of approximating the continuous values of the signal to a finite number of discrete values, and the total data of the integral sampling is approximated into a plurality of discrete values after quantizing continuous values, that is, a plurality of compression measuring values.

The compression domain detector 50 is configured to take a plurality of the pulse signals as a compression sampling period, obtain the target position of the target to be detected according to the compression measuring value of all the pulse signals in one of the compression sampling periods, and output the target position from the target position output end.

Figure 2:
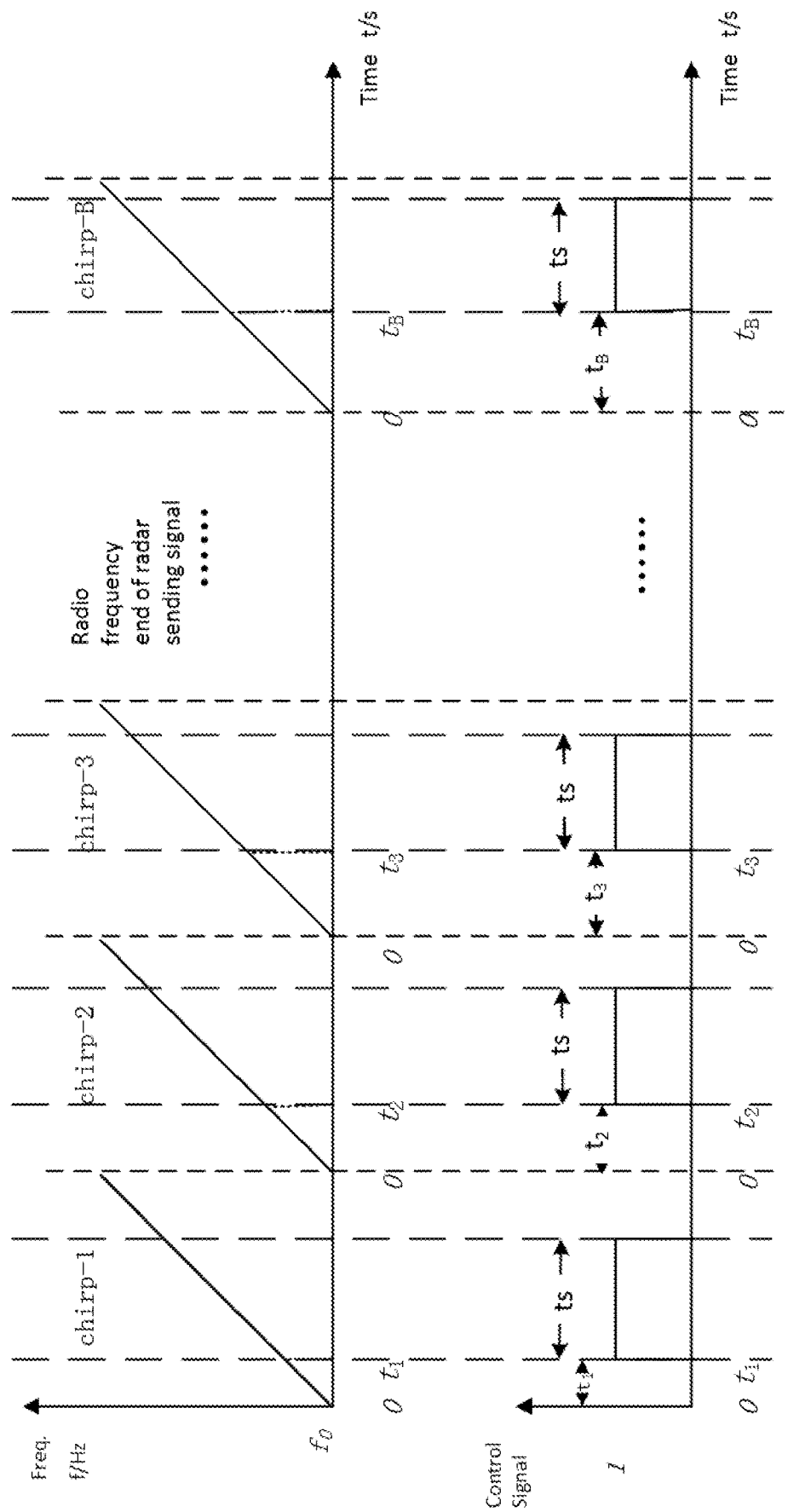
FIG. 2 is a schematic diagram illustrating integral sampling in a single sampling radar signal processing system according to an embodiment of the present disclosure.

Refer to FIG. 2. FIG. 2 is a schematic diagram illustrating integral sampling in a single sampling radar signal processing system according to an embodiment of the present disclosure. The process of integral sampling in a single sampling radar signal processing system is described below with reference to the schematic diagram of FIG. 2.

As shown in FIG. 2, taking a linear frequency modulation signal (that is, a chirp signal) as a radar signal as an example, the chirp signal comprises a plurality of pulse repetition periods. The radar begins to emit signals while the entire processing system begins to operate. After the radar receives the echo signal sent by the detection target, the radar preprocesses the echo signal to obtain an intermediate-frequency radar signal, that is, an intermediate-frequency (IF) signal, and sends the preprocessed radar signal to the integral sampler 20, wherein the purpose of preprocessing the echo signal is to lower the frequency of the echo signal to improve the signal to noise ratio.

Further, after the radar starts to emit the signal, the controller 40 operates synchronously with the radio frequency end of the radar. At this time which is defined as time 0, the controller 40 receives the synchronization signal sent by the radio frequency end of the radar. The integral sampler 20 receives the radar signal preprocessed by the radar, and controls the initial integral sampling time of each chirp pulse signal, so that the initial integral sampling time of each chirp pulse signal is a preset time, wherein B consecutive chirp pulse signals form a sampling period, that is, a compression sampling period, so that after B consecutive chirp pulse signals are sequentially delayed by t1, t2, t3, . . . , tb, compression sampling is started for B chirp pulse signals, respectively. A random sampling value in each chirp pulse signal is obtained, and the random sampling value in each chirp pulse signal is accumulated to obtain an integral sampling value of each chirp pulse signal. After the integral sampler 20 obtains the integral sampling value of one pulse signal each time, the integral sampling value of the pulse signal is sent to the ADC module 30.

B is a positive integer greater than 3, the radar signal is divided into a plurality of compression sampling periods, and the value of B in each compression sampling period can be adjusted according to actual conditions. Compression sampling refers to compressed sensing. In daily research, the process of performing compressed sensing on analog signal to obtain compression measurement is referred to as compression sampling.

Further, the sampling frequency of the integral sampler 20 is Fs, and the sampling period is $$T_s = \frac{1}{F_s},$$

and then the relationship between the preset time of sequentially delaying of B consecutive chirp pulse signals during the sampling of the integral sampler 20 can be obtained:

$$t_i = t_1 + (i-1)\frac{1}{BF_s} = t_1 + (i-1)\frac{T_s}{B}, i = 1, 2, \ldots, B,$$

wherein the $t_i$ indicates the time required for the chirp pulse signal to be delayed, and the integral sampler 20 samples for $t_s$ seconds continuously when sampling each chirp pulse signal.

Further, as shown in FIG. 2, the above system is a radar signal processing system for realizing compression sampling of a radar signal in a time division manner. In a single pulse repetition period, a sample value is obtained by compression sampling. Therefore, the system is mainly applied to single-sample radar signal processing.

In the embodiment of the present disclosure, a single sampling radar signal processing system is provided, wherein the system comprises: a pseudo-random sequence generator, an integral sampler, an ADC module, a controller and a compression domain detector, wherein the integral sampler is connected to the pseudo-random sequence generator, the controller and the ADC module, respectively, and the ADC module is connected to the compression domain detector. Since the initial integral sampling time of each pulse signal can be controlled when the integral sampler performs integral sampling on the pulse signal in the radar signal, each pulse signal is sequentially delayed by different times during integral sampling, and a sample value is obtained by compression sampling in a single pulse repetition period, so as to sample at a sampling frequency much lower than the Nyquist frequency. The system has the advantages such as a low sampling frequency, a simple structure, a small number of ADCs, a high compression ratio and a good detection effect when processing the radar signal.

Figure 3:
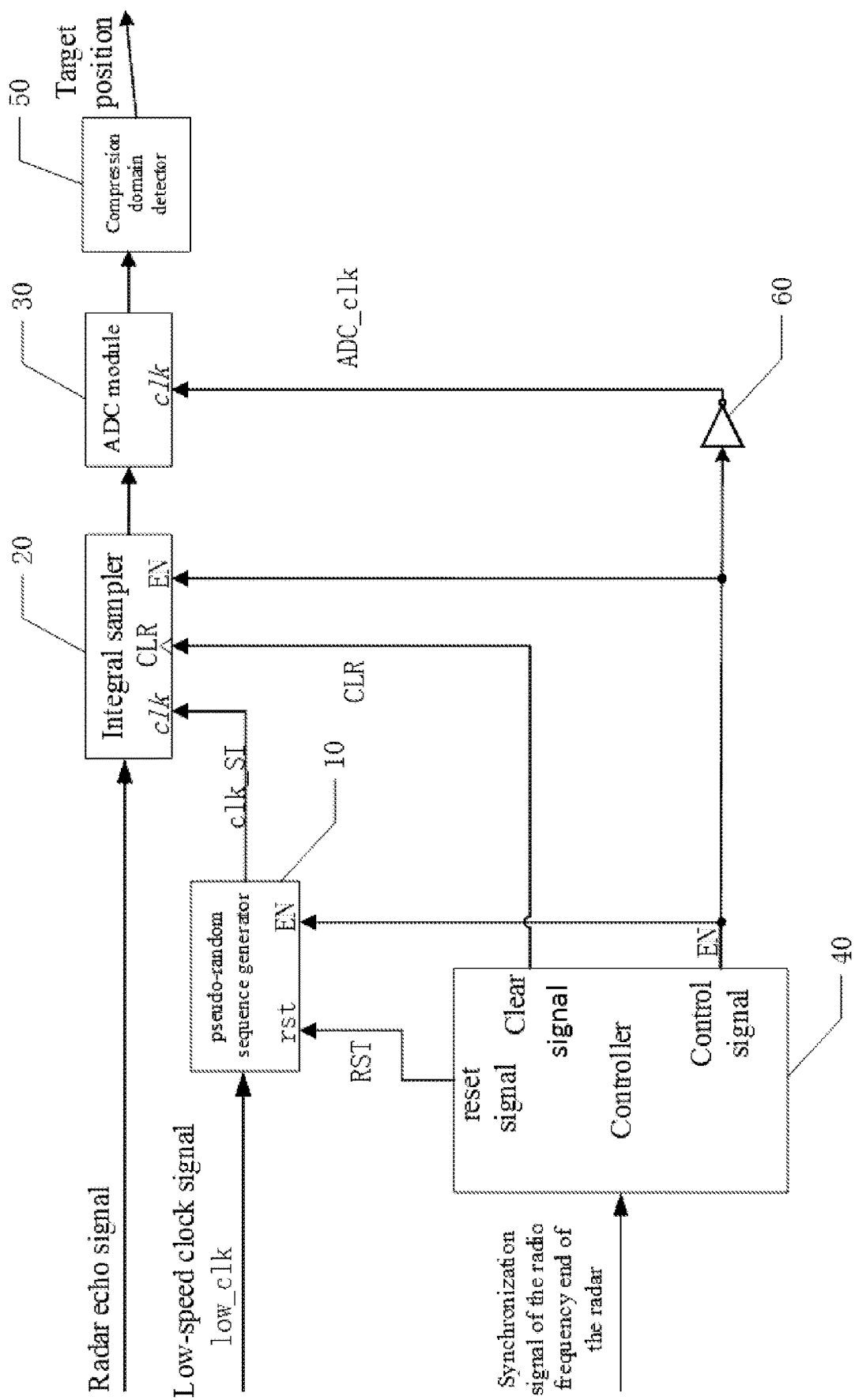
FIG. 3 is a system structural diagram illustrating a single sampling radar signal processing system according to another embodiment of the present disclosure.

Refer to FIG. 3. FIG. 3 is a system structural diagram illustrating a single sampling radar signal processing system according to another embodiment of the present disclosure.

The system structural diagram in FIG. 3 is based on the system structural diagram in FIG. 1, and further details the connection relationship of other components in the system and the functions of the components. Therefore, the connection and function of the same components in FIG. 3 and FIG. 1 will not be detailed here. Only the differences between FIG. 3 and FIG. 1 will be described below.

The controller 40 further comprises a synchronization signal input end and a reset signal output end; the pseudo-random sequence generator further comprises a reset signal receiving end and a control signal receiving end.

The synchronization signal input end of the controller 40 is connected to the radio frequency end of the radar, the reset signal output end of the controller 40 is connected to the reset signal receiving end of the pseudo-random sequence generator 10, and the control signal output end of the controller 40 is connected to the control signal receiving end of the pseudo-random sequence generator 10.

Further, the controller 40 is further configured to receive the synchronization signal sent by the radio frequency end of the radar, generate a control signal, a reset signal and a clear signal according to the synchronization signal, send the control signal and the reset signal to the pseudo-random sequence generator 10, and send the clear signal and the control signal to the integral sampler 20.

After the controller 40 receives the synchronization signal sent by the radio frequency end of the radar, the radio frequency end operates simultaneously with the controller 40, that is, simultaneously starts operating at time 0 in FIG. 2. The radio frequency end starts to emit the synchronization signal from time 0, and the controller 40 starts counting from time 0.

Further, the controller 40 generates a control signal as an enable signal for controlling the operation of the pseudo-random sequence generator 10 and the integral sampler 20 according to the synchronization signal. The control signal is a pulse signal comprising level 1 and level 0. If the control signal is a pulse signal of level 1 at the first time, the pseudo-random sequence generator 10 and the integral sampler 20 are controlled to operate. If the control signal is a pulse signal of level 0 at the second time, the pseudo-random sequence generator 10 and the integral sampler 20 are controlled to stop operation.

Further, the controller 40 generates a reset signal according to the synchronization signal. The reset signal is used to control whether the pseudo-random sequence generator 10 resets. The reset signal is a pulse signal comprising level 1 and level 0. If the reset signal is a pulse signal of level 1 at the first time, the pseudo-random sequence generator 10 is controlled to reset, that is, the pseudo-random sequence generator 10 operates and is restored to a specific position. If the reset signal is a pulse signal of level 0 at the second time, the pseudo-random sequence generator 10 is controlled to operate normally.

Further, the controller 40 generates a clear signal according to the synchronization signal. The clear signal is used to control whether the pseudo-random sequence generator 10 performs internal data clearing. The clear signal is a pulse signal comprising level 1 and level 0. If the clear signal is a pulse signal of level 1 at the first time, the pseudo-random sequence generator 10 is controlled to perform internal data clearing. If the clear signal is a pulse signal of level 0 at the second time, the pseudo-random sequence generator 10 is controlled to operate normally.

Further, the pseudo-random sequence further comprises a signal receiving end.

The signal receiving end of the pseudo-random sequence is connected to the low-speed clock signal output end of the external clock.

The pseudo-random sequence generator 10 consists of a plurality of D triggers and is further configured to receive a low-speed clock signal output by the external clock, wherein the low-speed clock signal is a clock signal having a frequency much lower than the Nyquist sampling frequency. The clock frequency thereof is one B-th of the Nyquist sampling frequency. The pseudo-random sequence generator 10 generates a pseudo-random sequence according to the low-speed clock signal, the reset signal and the control signal.

Further, the system further comprises a NOT gate device 60. The input end of the NOT gate device 60 is connected to the control signal output end of the controller 40, and the output end of the NOT gate device 60 is connected to the control signal input end of the ADC module 30.

The NOT gate device 60 is configured to invert the control signal sent by the controller 40, obtain an inverted control signal, and send the inverted control signal to the ADC module 30.

Further, the ADC module 30 is further configured to receive the inverted control signal sent by the NOT gate device 60, and determine the time of quantizing the integral sampling value of the pulse signal according to the inverted control signal.

Figure 4:
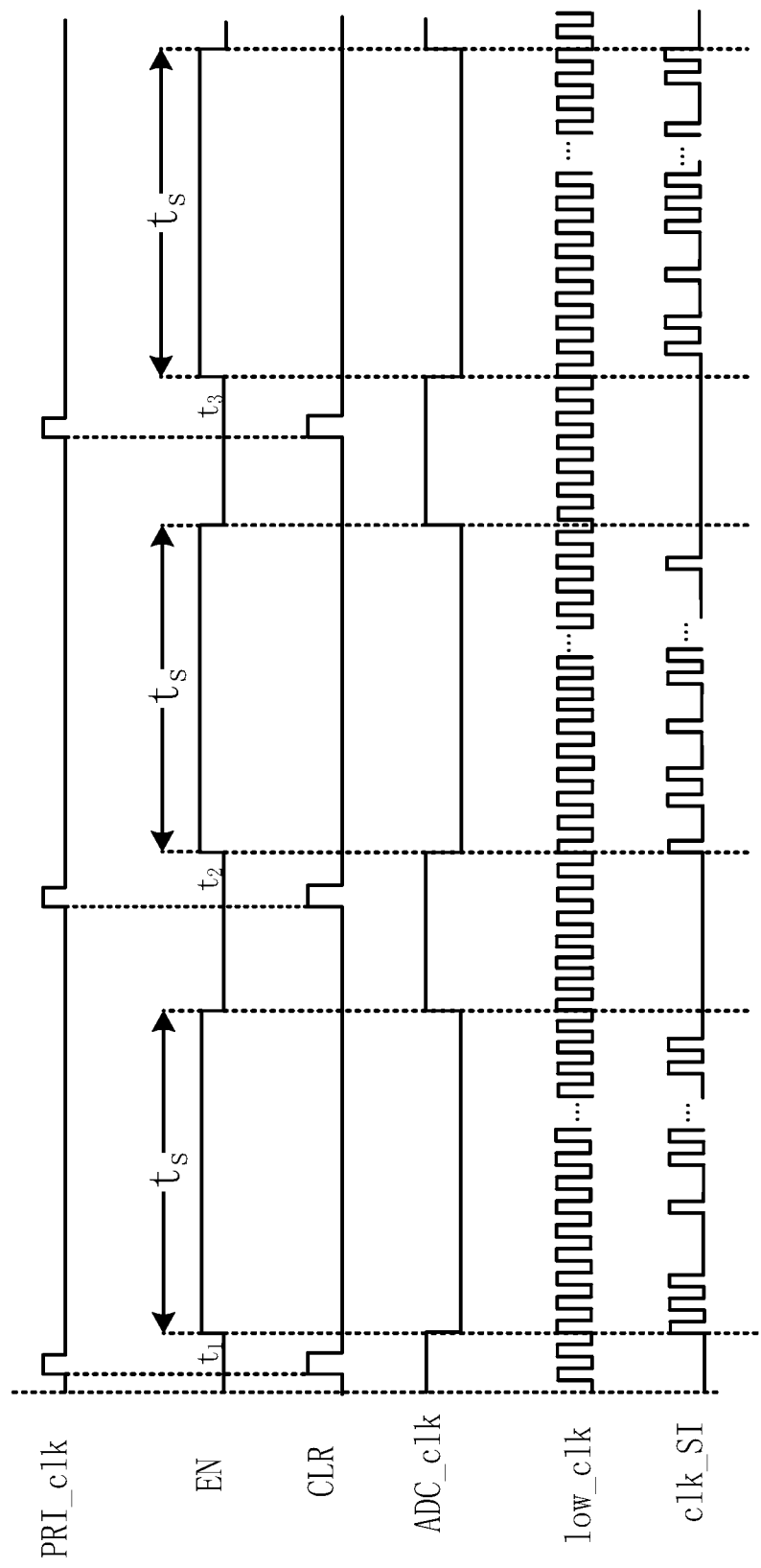
FIG. 4 is a timing diagram illustrating some signals in a single sampling radar signal processing system according to an embodiment of the present disclosure.

Refer to FIG. 4. FIG. 4 is a timing diagram illustrating some signals in a single sampling radar signal processing system according to an embodiment of the present disclosure. The workflow of the system will be specifically described below based on the timing diagram of some signals in FIG. 4.

As can be seen from FIG. 4, after the radar starts to emit signals, the controller 40 operates synchronously with the radio frequency end of the radar. At this time which is defined as time 0, the controller 40 receives the synchronization signal sent by the radio frequency end of the radar. After the controller 40 receives the synchronization signal sent by the radar, the controller 40 generates a control signal, a reset signal and a clear signal according to the synchronization signal.

Further, the controller 40 sends the control signal and the reset signal to the pseudo-random sequence generator 10, and sends the clear signal and the control signal to the integral sampler 20.

The control signal, the reset signal and the clear signal are pulse signals formed by level 1 and level 0. The pulse signal of level 1 and the pulse signal of level 0 represent different states of the signal, respectively.

Further, the pseudo-random sequence receives the low-speed clock signal output by the external clock, and generates a pseudo-random sequence according to the low-speed clock signal, the reset signal and the control signal.

Further, the integral sampler 20 receives the radar signal of the detection target sent by the radar, and performs integral sampling on the pulse signal in the radar signal according to the pseudo-random sequence sent by the pseudo-random sequence generator 10, the clear signal and the control signal sent by the controller 40.

Further, the integral sampler 20 controls the initial integral sampling time of each pulse signal such that consecutive pulse signals are sequentially delayed by different preset times during integral sampling. Specifically, the integral sampler 20 takes the time at which the clear signal jumps to level 1 through the rising edge as the initial time of the delay of the single pulse signal. At this time, the integral sampler 20 is in the internal data clear state. Since the control signal is in the 0-level state, the integral sampler 20 does not perform any processing on a single pulse signal, and the pseudo-random sequence generator 10 does not output a pseudo-random sequence; after the clear signal continues to be in the 1-level state for a period of time, the clear signal reaches the time at which the clear signal jumps to level 0 through the falling edge. That is, the integral sampler 20 completes internal data clearing. The control signal is still in the 0-level state at this time. The integral sampler 20 still does not perform any processing on the single pulse signal, the pseudo-random sequence generator 10 still does not output a pseudo-random sequence, until the time at which the control signal jumps to level 1 through the rising edge is taken as the end time of the delay of the single pulse signal. That is, the delay of the single pulse signal is completed. The pseudo-random sequence generator 10 outputs a pseudo-random sequence to the integral sampler 20, which starts to randomly sample a single pulse signal and accumulate data.

Further, when the integral sampler 20 performs integral sampling on a single pulse signal, the time at which the control signal jumps to level 1 through the rising edge is taken as the integral sampling initial time of the single pulse signal, and the time at which the control signal jumps to level 0 through the falling edge is taken as the integral sampling ending time of the single pulse signal. Therefore, the continuous sampling time for the radar signal is determined by the control signal.

Further, when the integral sampler 20 performs integral sampling on the single pulse signal, the pseudo-random sequence sent by the pseudo-random sequence generator 10 controls the integral sampling position of the single pulse signal as a clock signal and a measurement matrix of the integral sampler 20, and multiplies the sampling position of the single pulse signal by the pseudo-random sequence. A random sampling value is obtained for each integral sampling position. Finally, at the time at which the control signal jumps to level 0 through the falling edge, the integral sampler 20 obtains all the random sampling values of the single pulse signal, completes the accumulation of all the random sampling values to obtain the integral sampling value, and repeats the above process to obtain all integral sampling values of each pulse signal in B chirp pulse signals.

Further, after the integral sampler 20 obtains the integral sampling value of one pulse signal each time, the integral sampling value of the pulse signal is sent to the ADC module 30.

Further, after receiving the integral sampling value of the pulse signal, the ADC module 30 quantizes the integral sampling value of the pulse signal according to the inverted control signal, obtains a compression measuring value of the pulse signal, and sends the compression measuring value of the pulse signal to the compression domain detector 50.

Specifically, at the time at which the control signal jumps to level 0 through the falling edge, the pseudo-random sequence generator 10 and the integral sampler 20 stop operation. At this time, at the time at which the inverted control signal jumps to level 1 through the rising edge, the ADC module 30 quantizes the integral sampling value of the pulse signal and obtains a compression measuring value of the pulse signal; at the time at which the control signal jumps to level 1 through the rising edge, the pseudo-random sequence generator 10 and the integral sampler 20 start to operate. At this time, at the time at which the inverted control signal jumps to level 0 through the falling edge, the ADC module 30 stops operation.

Further, the compression domain detector 50 takes the B chirp pulse signals as a compression sampling period. The B chirp pulse signals are continuous pulse signals. The target position of the target to be detected is obtained according to the compression measuring values of all the chirp pulse signals in a compression sampling period, and the target position is output from the target position output end of the compression domain detector 50. Specifically, the above steps are repeated. The compression domain detector 50 outputs the position information of a detection target whenever consecutive B chirp pulse signals pass, that is, a compression sampling period passes.

Figure 5:
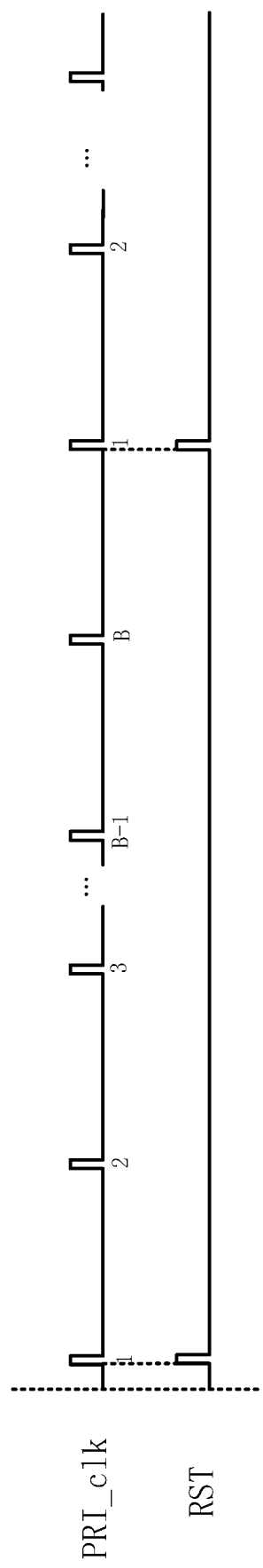
FIG. 5 is a timing diagram illustrating a reset signal of a single sampling radar signal processing system according to an embodiment of the present disclosure.

Refer to FIG. 5. FIG. 5 is a timing diagram illustrating a reset signal of a single sampling radar signal processing system according to an embodiment of the present disclosure.

As shown in FIG. 5, the consecutive B pulse signals are used as a compression sampling period of the radar signal. The pseudo-random sequence generator 10 resets every time before the compression sampling of one compression sampling period is started, and the reset signal is generated by the controller 40, as shown in FIG. 5. The reset signal is a pulse signal comprising level 1 and level 0. At the time at which the reset signal jumps to level 1 through the rising edge, the pseudo-random sequence generator 10 resets; at the time at which the reset signal jumps to level 0 through the falling edge, the pseudo-random sequence generator 10 ends resetting; if the reset signal is at level 0, the pseudo-random sequence generator 10 does not reset.

In the single sampling radar signal processing system provided by the embodiment of the present disclosure, the integral sampler is connected to the pseudo-random sequence generator, the controller and the ADC module, respectively, and the ADC module is connected to the compression domain detector. The initial integral sampling time of each pulse signal can be controlled when the integral sampler performs integral sampling on the pulse signal in the radar signal, so that each pulse signal is sequentially delayed by different times during integral sampling, and a sample value is obtained by compression sampling in a single pulse repetition period, so as to sample at a sampling frequency much lower than the Nyquist frequency. The system has the advantages such as a low sampling frequency, a simple structure, a small number of ADCs, a high compression ratio and a good detection effect when processing the radar signal.

Figure 6:
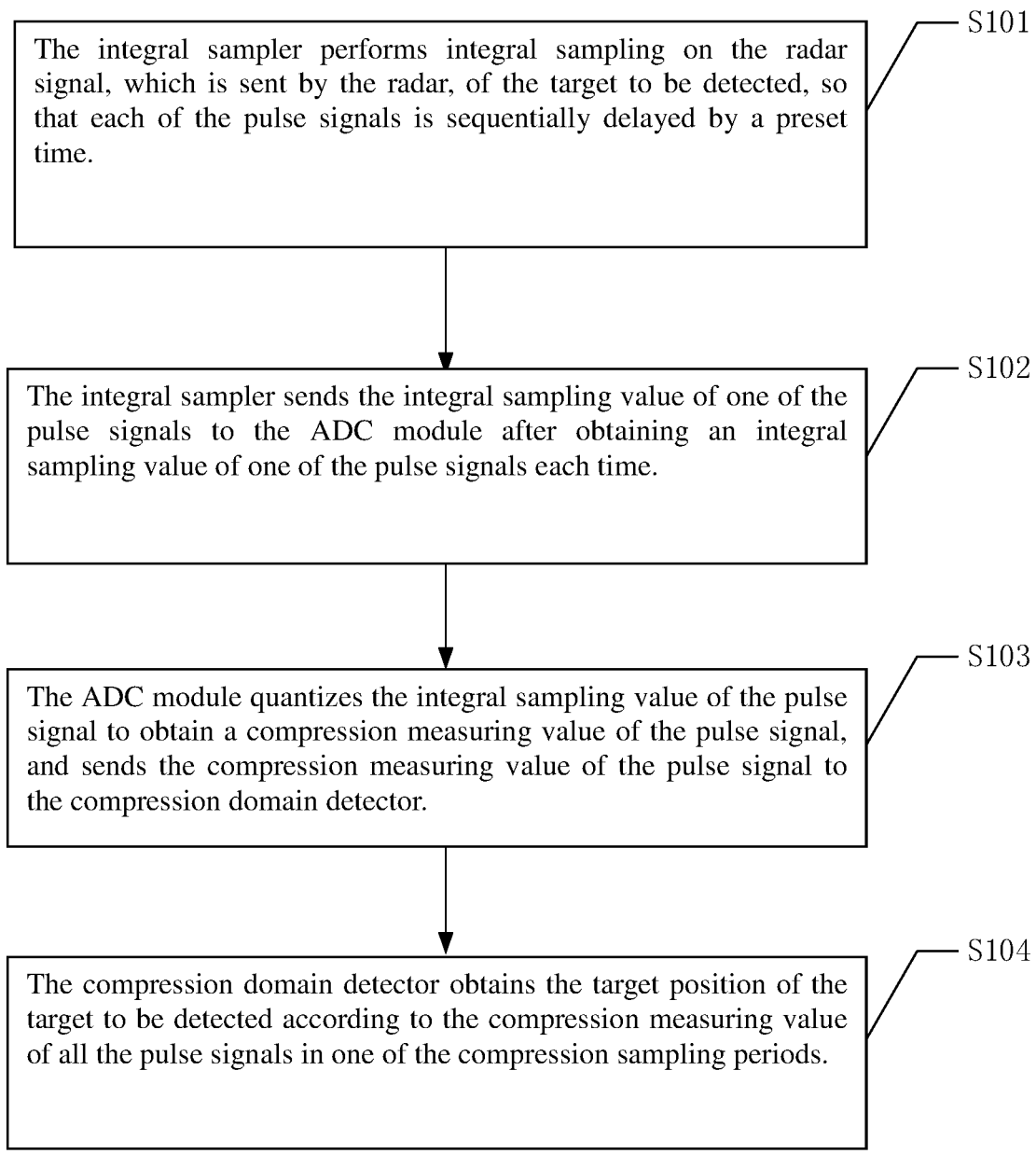
FIG. 6 is a schematic flowchart diagram illustrating a single sampling radar signal processing method according to an embodiment of the present disclosure.

Refer to FIG. 6. FIG. 6 is a schematic flowchart diagram illustrating a single sampling radar signal processing method according to an embodiment of the present disclosure.

As shown in FIG. 6, the method comprises the following steps:

S101. the integral sampler performs integral sampling on the radar signal according to the pseudo-random sequence, the clear signal, and the control signal after receiving the radar signal, which is sent by the radar, of the target to be detected, and controls the initial integral sampling time of each pulse signal in the radar signal, so that each of the pulse signals is sequentially delayed by a preset time during integral sampling;

S102. the integral sampler sends the integral sampling value of one of the pulse signals to the ADC module after obtaining an integral sampling value of one of the pulse signals each time;

S103. the ADC module quantizes the integral sampling value of the pulse signal after receiving the integral sampling value of the pulse signal, obtains a compression measuring value of the pulse signal, and sends the compression measuring value of the pulse signal to the compression domain detector;

S104. the compression domain detector takes a plurality of the pulse signals as a compression sampling period, obtains the target position of the target to be detected according to the compression measuring value of all the pulse signals in one of the compression sampling periods, and outputs the target position from the target position output end.

Further, before the integral sampler receives the radar signal, which is sent by the radar, of the target to be detected, the method further comprises the following step:

the controller receives the synchronization signal sent by the radar, and generates a control signal, a reset signal and a clear signal according to the synchronization signal;

the controller sends the control signal and the reset signal to the pseudo-random sequence generator, and sends the clear signal and the control signal to the integral sampler.

Further, after the controller sends the control signal and the reset signal to the pseudo-random sequence generator, the method comprises the following step:

the pseudo-random sequence generator receives the low-speed clock signal output by the external clock, generates a pseudo-random sequence according to the low-speed clock signal, the reset signal and the control signal, and sends the pseudo-random sequence to the integral sampler.

Further, before the integral sampler sends the integral sampling value of one of the pulse signals to the ADC module after obtaining an integral sampling value of one of the pulse signals each time, the method comprises the following step:

the NOT gate device inverts the control signal sent by the controller, obtains an inverted control signal, and sends the inverted control signal to the ADC module.

Further, after receiving the integral sampling value of the pulse signal, the ADC module quantizes the integral sampling value of the pulse signal, and obtains the compression measuring value of the pulse signal, comprising the following step:

after receiving the integral sampling value of the pulse signal, the ADC module determines the time at which the integral sampling value of the pulse signal is quantized according to the inverted control signal sent by the NOT gate device, and quantizes the integral sampling value of the pulse signal.

Figure 7:
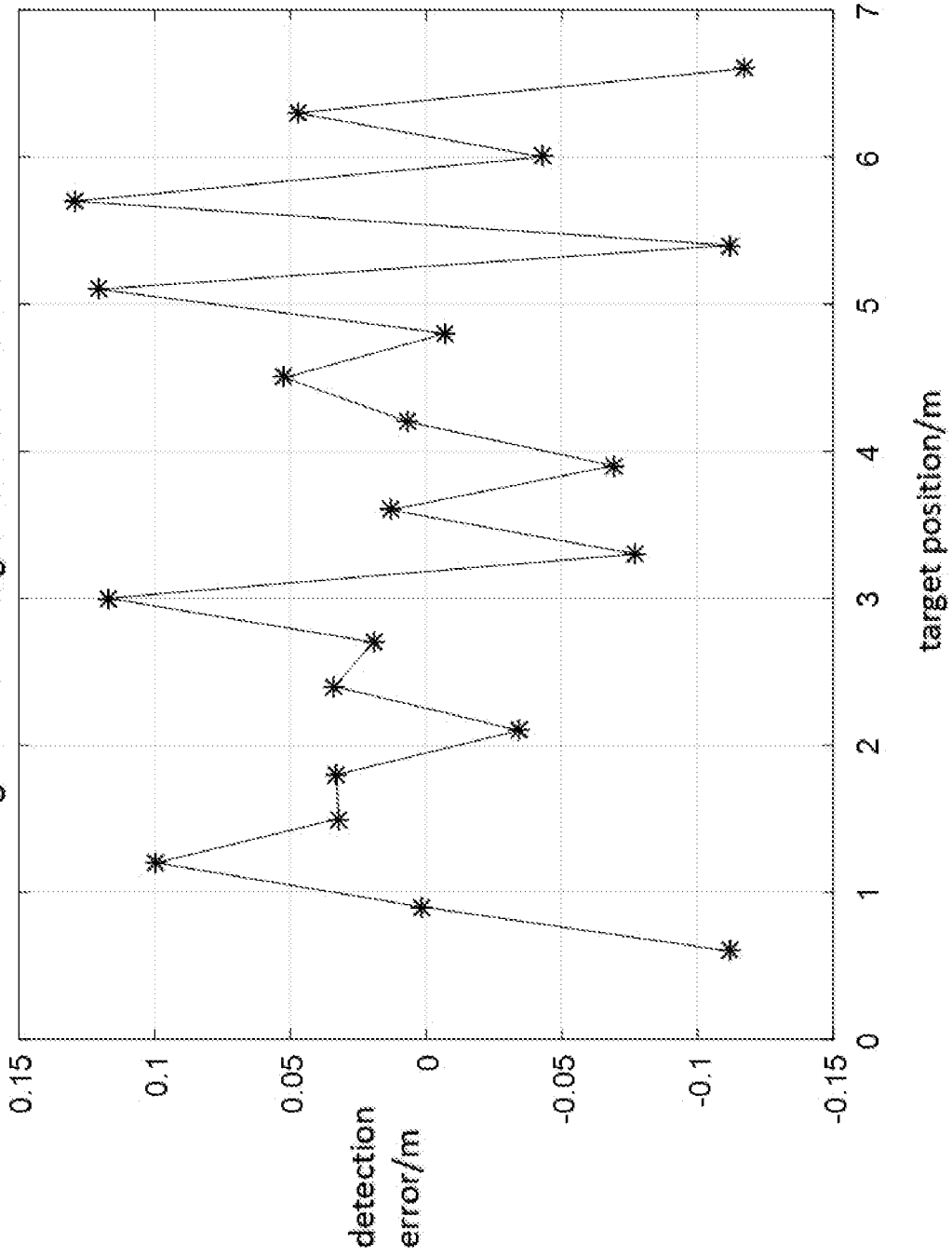
FIG. 7 is a diagram illustrating error results of a single sampling radar signal processing method according to an embodiment of the present disclosure.
Figure 8:
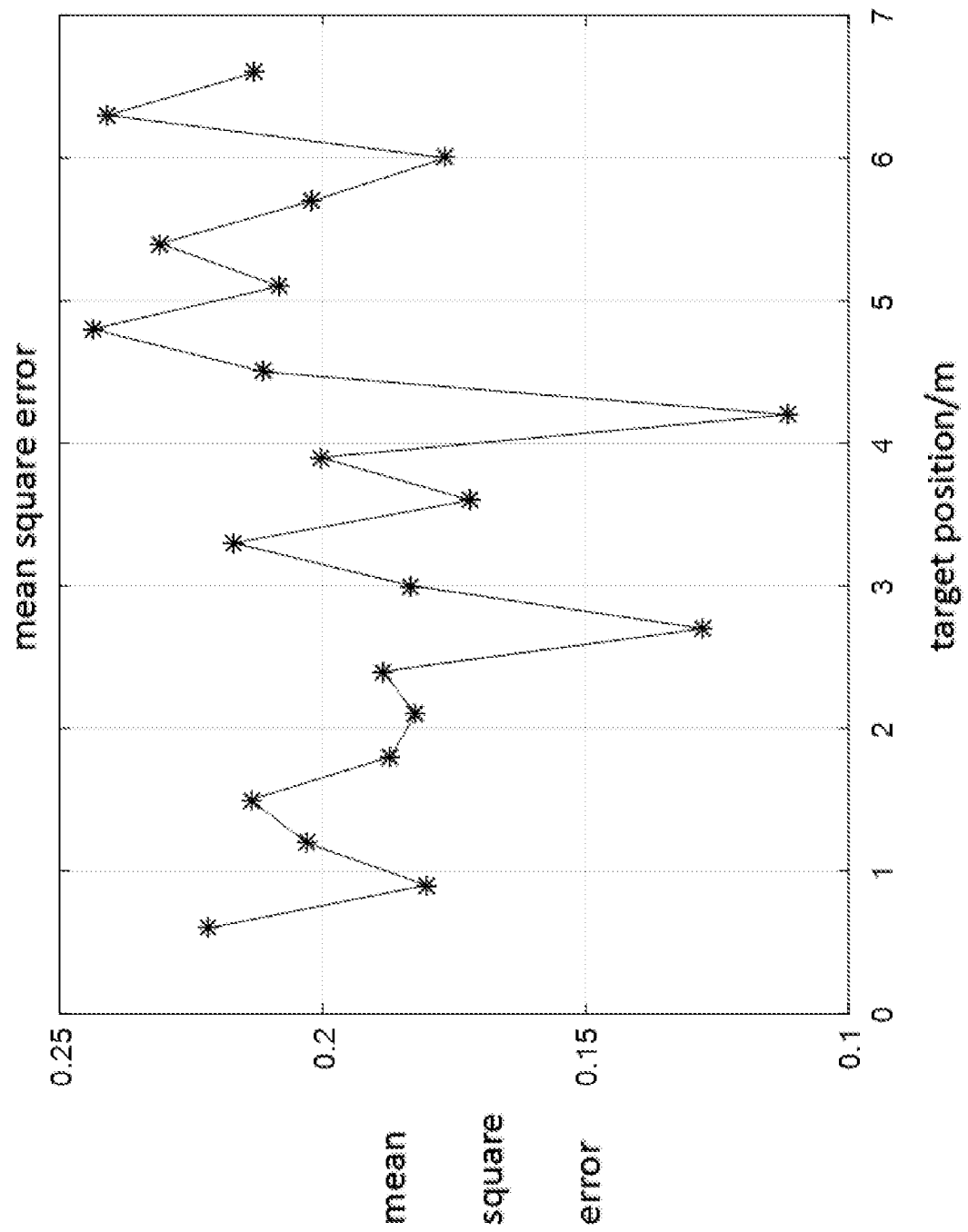
FIG. 8 is a diagram illustrating a mean square error of a single sampling radar signal processing method according to an embodiment of the present disclosure.

Refer to FIG. 7 and FIG. 8. FIG. 7 is a diagram illustrating error results of a single sampling radar signal processing method according to an embodiment of the present disclosure. FIG. 8 is a diagram illustrating a mean square error of a single sampling radar signal processing method according to an embodiment of the present disclosure.

FIG. 7 is a diagram illustrating error results between the actual position of the target to be detected and the position of the target to be detected obtained by using the single sampling radar signal processing method in the embodiment of the present disclosure. FIG. 8 is a diagram illustrating a mean square error between the actual position of the target to be detected and the position of the target to be detected obtained by using the single sampling radar signal processing method in the embodiment of the present disclosure.

As can be seen from FIG. 7 and FIG. 8, the single sampling radar signal processing method according to the embodiment of the present disclosure has the advantages such as a low sampling frequency, a simple structure, a small number of ADCs, a high compression ratio and a good detection effect. The specific explanation is as follows.

The sampling frequency is low. In the embodiment, sampling is performed at a sampling frequency much lower than the Nyquist frequency. Both the clock signal of the ADC module and the sampling frequency of the ADC module require only the rate of radar pulse repetition. Taking the example application as an example, the equivalent sampling frequency in the example application is 100 MHz/s, but the sampling frequency of the ADC module used is 6250 Hz/s, wherein the radar pulse repetition period is 160 microseconds.

The structure is simple and the number of ADCs is small. In the embodiment, not only the effect of multi-phase random sub-sampling is achieved, but also both the pre-processing circuit and the compression sampling circuit do not require a complicated circuit structure to implement.

The compression ratio is high and the detection effect is good. In the embodiment, one sampling value is obtained by compression sampling in a single pulse repetition period. Taking the example application as an example, in the embodiment, the output signal is 2560 points, the compression measuring value is 40, and the compression ratio is 1.56%; and the detection error at the detection target position of the compression measuring value falls within one distance unit.

The detection effect is shown in FIG. 7. The abscissa is the detection target position, and the ordinate is the error value between the detected position and the real position of the target to be detected. The compression measuring value is 10 and the compression ratio is about 0.4%. As can be seen from FIG. 7, the measurement error is within ±0.1953 m, no more than one distance unit. The compression sampling method in the embodiment can effectively acquire the information of the signal and effectively detect the position of the target.

In the embodiment of the present disclosure, a single sampling radar signal processing method is provided. Since the initial integral sampling time of each pulse signal can be controlled when the integral sampler performs integral sampling on the pulse signal in the radar signal, each pulse signal is sequentially delayed by different times during integral sampling, and a sample value is obtained by compression sampling in a single pulse repetition period, so as to sample at a sampling frequency much lower than the Nyquist frequency. The method has the advantages such as a low sampling frequency, a small number of ADCs, a high compression ratio and a good detection effect when processing the radar signal.

In the several embodiments provided in the present disclosure, it should be understood that the disclosed system and method can be implemented in other ways. For example, the system embodiments described above are merely illustrative. For example, the division of devices is only a logical function division. In actual implementation, there may be another division manner. For example, a plurality of devices or components may be combined or integrated into another system, or some features can be ignored or not executed. In addition, the mutual coupling or direct coupling or communication connection shown or discussed may be implemented via some interfaces. The indirect coupling or communication connection of devices or modules may be implemented electrically, mechanically or in other forms.

It should be noted that, for the sake of brevity, the above method embodiments are all described as a series of action combinations, but those skilled in the art should understand that the present disclosure is not limited by the described action sequence, because certain steps may be executed in other sequences or concurrently in accordance with the present disclosure. Secondly, those skilled in the art should also understand that the embodiments described in the specification are all preferred embodiments, and the actions and modules involved are not necessarily required by the present disclosure.

In the above embodiments, the various embodiments are described with their own emphasis. Refer to the related descriptions of other embodiments for the parts that are not detailed in a certain embodiment.

The above is a description of a single-sampling radar signal processing system and method according to the present disclosure. For those skilled in the art, according to the idea of the embodiments of the present disclosure, there will be changes in specific implementations and application scopes. In summary, the content of the specification should not be construed as limiting the present disclosure.

What is claimed is:

1. A single sampling radar signal processing system, comprising:
    a pseudo-random sequence generator, an integral sampler, an analog-to-digital converter (ADC) module, a controller and a compression domain detector; wherein
    the pseudo-random sequence generator comprises a pseudo-random sequence output end;
    the integral sampler comprises a radar signal input end, a pseudo-random sequence receiving end, an integral sampling value output end, a clear signal input end and a control signal input end;
    the ADC module comprises an integral sampling value input end and a compression measuring value output end;
    the controller comprises a clear signal output end and a control signal output end;
    the compression domain detector comprises a compression measuring value input end and a target position output end;
    the radar signal input end is connected to a receiving end of the radar, the pseudo-random sequence receiving end is connected to the pseudo-random sequence output end, the integral sampling value output end is connected to the integral sampling value input end, the clear signal input end is connected to the clear signal output end, and the control signal input end is connected to the control signal output end;
    the compression measuring value output end is connected to the compression measuring value input end;
    the pseudo-random sequence generator is configured to generate a pseudo-random sequence according to a low-speed clock signal input by an external clock, and send the pseudo-random sequence to the integral sampler;
    the controller is configured to generate a clear signal and a control signal after receiving a synchronization signal sent by the radar, send the clear signal to the integral sampler, and send the control signal to the integral sampler;
    the integral sampler is configured to perform integral sampling on the radar signal according to the pseudo-random sequence, the clear signal and the control signal after receiving the radar signal, which is sent by the radar, of the target to be detected, to obtain an integral sampling value of each pulse signal in the radar signal, and configured to control an initial integral sampling time of each pulse signal in the radar signal in such a way that each of the pulse signals is sequentially delayed by a preset time during integral sampling;
    the integral sampler is further configured to send the integral sampling value of each pulse signal to the ADC module after obtaining the integral sampling value of each pulse signal;
    the ADC module is configured to quantize the integral sampling value of the pulse signal after receiving the integral sampling value of the pulse signal, obtain a compression measuring value of the pulse signal, and send the compression measuring value of the pulse signal to the compression domain detector; and
    the compression domain detector is configured to take a plurality of the pulse signals as a compression sampling period, obtain the target position of the target to be detected according to the compression measuring value of all the pulse signals in one of the compression sampling periods, and output the target position from the target position output end.

2. The system of claim 1, wherein the controller further comprises a synchronization signal input end and a reset signal output end;
    the pseudo-random sequence generator further comprises a reset signal receiving end and a control signal receiving end;
    the synchronization signal input end is connected to the radio frequency end of the radar, the reset signal output end is connected to the reset signal receiving end, and the control signal output end of the controller is connected to the control signal receiving end of the pseudo-random sequence generator;
    the controller is further configured to receive the synchronization signal sent by the radio frequency end of the radar, generate a control signal, a reset signal and a clear signal according to the synchronization signal, send the control signal and the reset signal to the pseudo-random sequence generator, and send the clear signal and the control signal to the integral sampler.

3. The system of claim 2, wherein the pseudo-random sequence further comprises a signal receiving end;
    the signal receiving end of the pseudo-random sequence is connected to the low-speed clock signal output end of the external clock;
    the pseudo-random sequence is further configured to receive the low-speed clock signal output by the external clock, and generate a pseudo-random sequence according to the low-speed clock signal, the reset signal and the control signal.

4. The system of claim 3, wherein the system further comprises a NOT gate device;
    the input end of the NOT gate device is connected to the control signal output end of the controller, and the output end of the NOT gate device is connected to the control signal input end of the ADC module;

the NOT gate device is configured to invert the control signal sent by the controller, obtain an inverted control signal, and send the inverted control signal to the ADC module.

5. The system of claim 4, wherein the ADC module is further configured to receive the inverted control signal sent by the NOT gate device, and determine the time of quantizing the integral sampling value of the pulse signal according to the inverted control signal.

6. A single sampling radar signal processing method, comprising:

performing, by an integral sampler, integral sampling on the radar signal according to a pseudo-random sequence, a clear signal and a control signal after receiving the radar signal, which is sent by the radar, of the target to be detected, to obtain an integral sampling value of each pulse signal in the radar signal, and controlling an initial integral sampling time of each pulse signal in the radar signal in such a way that each of the pulse signals is sequentially delayed by a preset time during integral sampling;

sending, by the integral sampler, the integral sampling value of each pulse signal to an analog-to-digital converter (ADC) module after obtaining the integral sampling value of each pulse signal;

quantizing, by the ADC module, the integral sampling value of the pulse signal after receiving the integral sampling value of the pulse signal, obtaining a compression measuring value of the pulse signal, and sending the compression measuring value of the pulse signal to a compression domain detector; and taking, by the compression domain detector, a plurality of the pulse signals as a compression sampling period, obtaining a target position of the target to be detected according to the compression measuring value of all the pulse signals in one of the compression sampling periods, and outputting the target position from a target position output end.

7. The method of claim 6, wherein before receiving, by the integral sample, the radar signal, which is sent by the radar, of the target to be detected, comprising:

receiving, by the controller, the synchronization signal sent by the radar, and generating a control signal, a reset signal, and a clear signal according to the synchronization signal;

sending, by the controller, the control signal and the reset signal to the pseudo-random sequence generator, and sending the clear signal and the control signal to the integral sampler.

8. The method of claim 7, wherein after sending, by the controller, the control signal and the reset signal to the pseudo-random sequence generator, comprising:

receiving, by the pseudo-random sequence generator, the low-speed clock signal output by the external clock, generating a pseudo-random sequence according to the low-speed clock signal, the reset signal and the control signal, and sending the pseudo-random sequence to the integral sampler.

9. The method of claim 8, wherein before sending, by the integral sampler, the integral sampling value of one of the pulse signals to the ADC module after obtaining an integral sampling value of one of the pulse signals each time, comprising:

inverting, by the NOT gate device, the control signal sent by the controller, obtaining an inverted control signal, and sending the inverted control signal to the ADC module.

10. The method of claim 9, wherein quantizing, by the ADC module, the integral sampling value of the pulse signal after receiving the integral sampling value of the pulse signal, obtaining a compression measuring value of the pulse signal, comprising:

determining, by the ADC module, the time at which the integral sampling value of the pulse signal is quantized according to the inverted control signal sent by the NOT gate device after receiving the integral sampling value of the pulse signal, and quantizing the integral sampling value of the pulse signal.

* * * * *